United States Patent
Higaki

(10) Patent No.: US 9,904,046 B2
(45) Date of Patent: Feb. 27, 2018

(54) IMAGE PICKUP APPARATUS, IMAGE PICKUP SYSTEM, AND IMAGE PROCESSING METHOD

(71) Applicant: CANON KABUSHIKI KAISHA, Tokyo (JP)

(72) Inventor: Yoshinari Higaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 14/441,598

(22) PCT Filed: Dec. 24, 2013

(86) PCT No.: PCT/JP2013/085308
§ 371 (c)(1),
(2) Date: May 8, 2015

(87) PCT Pub. No.: WO2014/112324
PCT Pub. Date: Jul. 24, 2014

(65) Prior Publication Data
US 2015/0309300 A1    Oct. 29, 2015

(30) Foreign Application Priority Data
Jan. 18, 2013 (JP) .................... 2013-007453

(51) Int. Cl.
*H04N 7/12* (2006.01)
*G02B 21/36* (2006.01)
*G02B 21/14* (2006.01)

(52) U.S. Cl.
CPC .......... *G02B 21/367* (2013.01); *G02B 21/14* (2013.01); *G02B 21/361* (2013.01)

(58) Field of Classification Search
CPC ..... G02B 21/367; G02B 21/361; G02B 21/14
(Continued)

(56) References Cited

U.S. PATENT DOCUMENTS 4,200,354 A * 4/1980 Hoffman ................ G02B 21/14
 359/370
5,708,526 A   1/1998 Stankewitz
(Continued)

FOREIGN PATENT DOCUMENTS

JP   02035408 A   2/1990
JP   3502600 A    3/1996
(Continued)

OTHER PUBLICATIONS

D. J. Brady et al., "Compressive Holography," Optics Express, USA, Optical Society of America, Jul. 20, 2009, vol. 17, No. 15, p. 13040-13049.
(Continued)

*Primary Examiner* — Tung Vo
(74) *Attorney, Agent, or Firm* — Rossi, Kimms & McDowell LLP

(57) ABSTRACT

An image pickup apparatus includes an illumination optical system configured to illuminate a specimen, an imaging optical system configured to form an optical image of the specimen, a light modulator configured to generate at least one of a transmittance distribution and a phase distribution which are asymmetric with respect to an optical axis on a pupil plane of at least one of the illumination optical system and the imaging optical system, an image sensor configured to photoelectrically convert the optical image of the specimen formed by the imaging optical system, and a driver configured to change a relative position along an optical axis direction of the imaging optical system between a focal plane of the imaging optical system and at least one of the specimen and the image sensor. The driver changes the relative position in acquiring a plurality of images of the specimen.

16 Claims, 12 Drawing Sheets

(58) Field of Classification Search
USPC ............................................................ 348/135
See application file for complete search history.

(56) References Cited

U.S. PATENT DOCUMENTS

| | | | | |
|---|---|---|---|---|
| 5,751,475 | A * | 5/1998 | Ishiwata | G02B 21/14 359/371 |
| 5,808,791 | A * | 9/1998 | Kawano | G02B 21/14 359/363 |
| 6,118,516 | A * | 9/2000 | Irie | G03F 7/70125 355/53 |
| 6,259,557 | B1 * | 7/2001 | Miyashita | G02B 3/00 355/67 |
| 7,532,772 | B2 | 5/2009 | Brady | |
| 8,780,192 | B2 * | 7/2014 | Hayashi | G02B 21/0032 348/79 |
| 9,041,788 | B2 | 5/2015 | Ishiwata | |
| 9,261,699 | B2 | 2/2016 | Ouchi et al. | |
| 9,329,376 | B2 * | 5/2016 | Higaki | G02B 21/365 |
| 9,436,990 | B2 * | 9/2016 | Otani | G02B 21/0004 |
| 9,518,916 | B1 * | 12/2016 | Pandev | G01N 21/255 |
| 2003/0030902 | A1 * | 2/2003 | Fukushima | G02B 21/14 359/388 |
| 2004/0046102 | A1 | 3/2004 | Horiuchi et al. | |
| 2006/0227440 | A1 * | 10/2006 | Gluckstad | G02B 27/09 359/885 |
| 2006/0251994 | A1 * | 11/2006 | Huang | G03F 7/706 430/311 |
| 2007/0242133 | A1 * | 10/2007 | Ooki | G02B 21/365 348/79 |
| 2009/0091736 | A1 * | 4/2009 | Yamazoe | G03F 7/70091 355/77 |
| 2009/0168155 | A1 * | 7/2009 | Matsui | G02B 21/14 359/368 |
| 2010/0053580 | A1 * | 3/2010 | Sekine | G03F 7/70666 355/53 |
| 2010/0074486 | A1 | 3/2010 | Broser et al. | |
| 2010/0141959 | A1 * | 6/2010 | Kuchel | G01J 9/0215 356/521 |
| 2011/0293158 | A1 | 12/2011 | Popescu | |
| 2012/0008197 | A1 * | 1/2012 | Borck | G02B 21/06 359/386 |
| 2012/0026575 | A1 * | 2/2012 | Cheng | G02B 26/06 359/290 |
| 2012/0099172 | A1 * | 4/2012 | Ohki | G02B 21/086 359/239 |
| 2012/0262561 | A1 * | 10/2012 | Fukutake | G02B 21/12 348/79 |
| 2012/0281081 | A1 * | 11/2012 | Atif | G02B 27/0075 348/79 |
| 2012/0293644 | A1 * | 11/2012 | Fukutake | G02B 21/14 348/79 |
| 2012/0327208 | A1 * | 12/2012 | Higaki | G02B 21/365 348/79 |
| 2013/0002858 | A1 * | 1/2013 | Bridge | H04N 5/232 348/135 |
| 2013/0026347 | A1 * | 1/2013 | Watanabe | G02B 21/365 250/208.1 |
| 2013/0100283 | A1 * | 4/2013 | Terada | H04N 7/18 348/135 |

FOREIGN PATENT DOCUMENTS

| | | |
|---|---|---|
| JP | 2003121749 A | 4/2003 |
| JP | 2004354650 A | 12/2004 |
| JP | 2012073591 A | 4/2012 |
| WO | 2009153919 A1 | 12/2009 |

OTHER PUBLICATIONS

Y. Sung et al., "Three-dimensional imaging by partially coherent light under nonparaxial condition," Journal of the Optical Society of America A, USA, Optical Society of America, Apr. 2011, vol. 28, No. 4, p. 554-559.

D. L. Donoho et al., "Stable recovery of sparse overcomplete representations in the presence of noise," IEEE Transactions on Information Theory, USA, IEEE, Jan. 2006, vol. 52, Issue 1, p. 6-18.

J. M. Bioucas-Dias et al., "A New TwIST: Two-step iterative shrinkage/thresholding algorithms for image restoration," IEEE Transactions on Image Processing, USA, IEEE, Dec. 2007, vol. 16, Issue 12, p. 2992-3004.

C. J. R. Sheppard et al., "Three-dimensional imaging in a microscope," Journal of the Optical Society of America A, USA, Optical Society of America, Sep. 1989, vol. 6, No. 9, p. 1260-1269.

International Search Report issued in PCT/JP2013/085308, dated Apr. 8, 2014.

Office Action issued in Japanese Appln. No. 2013-007453, dated Sep. 27, 2016.

* cited by examiner

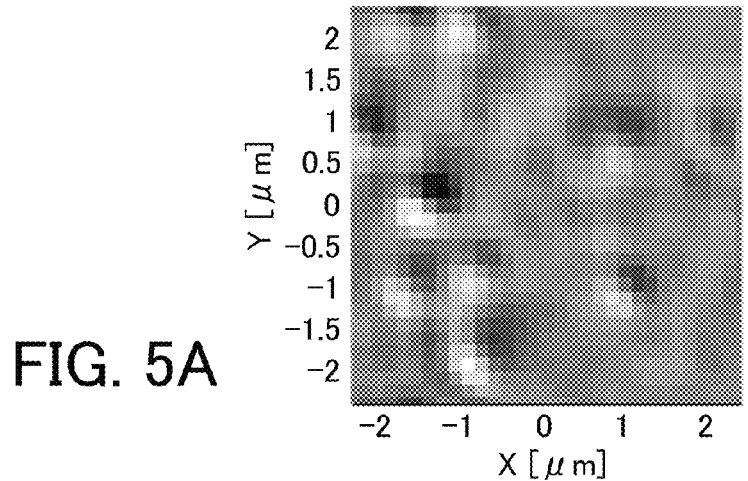
FIG. 5A  Z-STACK IMAGE (Z = −1.1 μm) IN NUMERICAL EXAMPLE 1
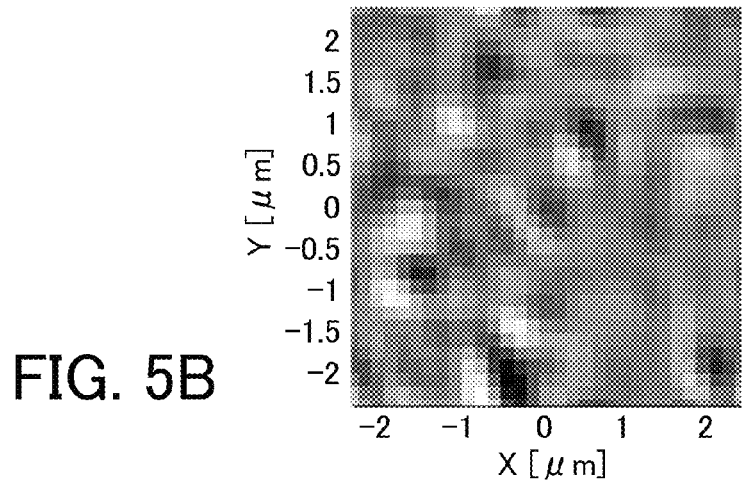
FIG. 5B  Z-STACK IMAGE (Z = 0.0 μm) IN NUMERICAL EXAMPLE 1
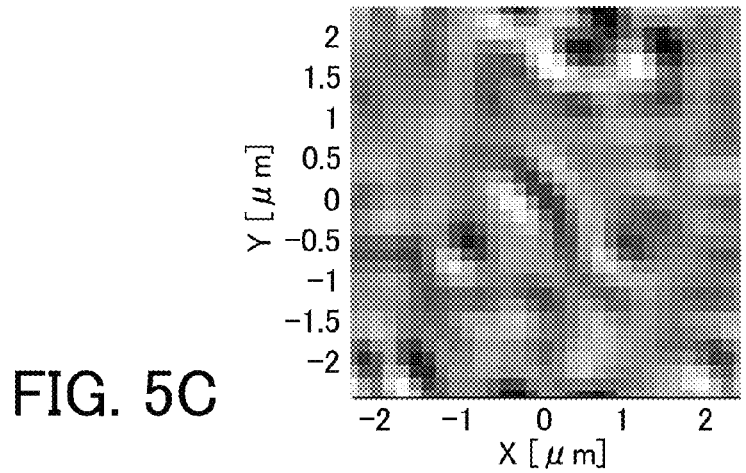
FIG. 5C  Z-STACK IMAGE (Z = +1.1 μm) IN NUMERICAL EXAMPLE 1

BINARIZED VIEW OF RECONSTRUCTED THREE-
DIMENSIONAL REFRACTIVE INDEX DISTRIBUTION
OF SPECIMEN IN NUMERICAL EXAMPLE 1

RECONSTRUCTED REFRACTIVE
INDEX DISTRIBUTION OF SPECIMEN
AT Y = 0 IN NUMERICAL EXAMPLE 1

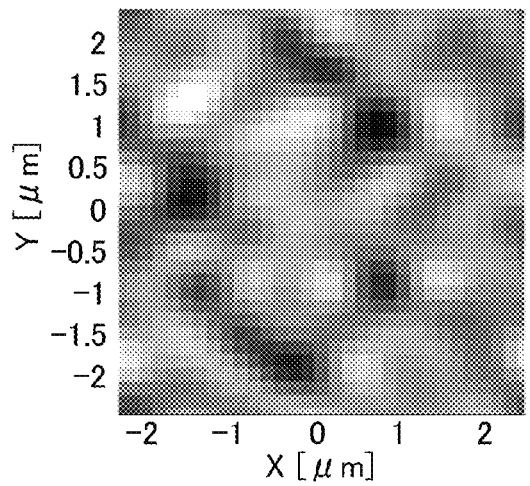
FIG. 8A  Z-STACK IMAGE (Z = −1.1 μm) IN NUMERICAL EXAMPLE 2
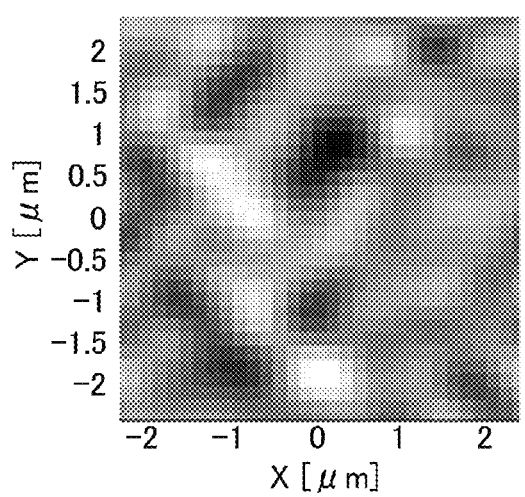
FIG. 8B  Z-STACK IMAGE (Z = 0.0 μm) IN NUMERICAL EXAMPLE 2
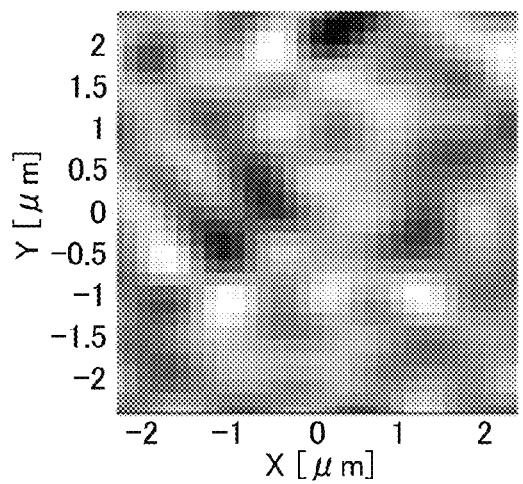
FIG. 8C  Z-STACK IMAGE (Z = +1.1 μm) IN NUMERICAL EXAMPLE 2

BINARIZED VIEW OF RECONSTRUCTED THREE-
DIMENSIONAL REFRACTIVE INDEX DISTRIBUTION
OF SPECIMEN IN NUMERICAL EXAMPLE 2

RECONSTRUCTED REFRACTIVE
INDEX DISTRIBUTION OF SPECIMEN
AT Y = 0 IN NUMERICAL EXAMPLE 2

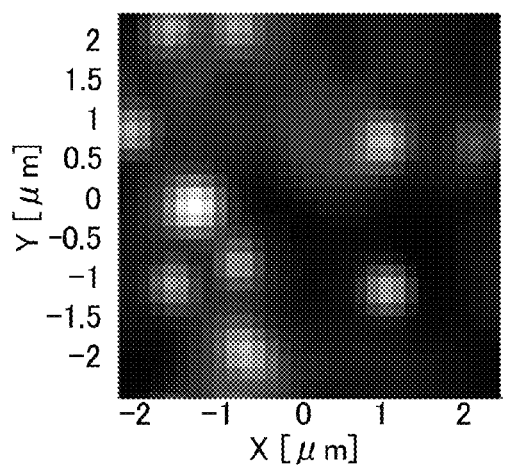
FIG. 12A  Z-STACK IMAGE (Z = −1.1 μm) IN NUMERICAL EXAMPLE 3
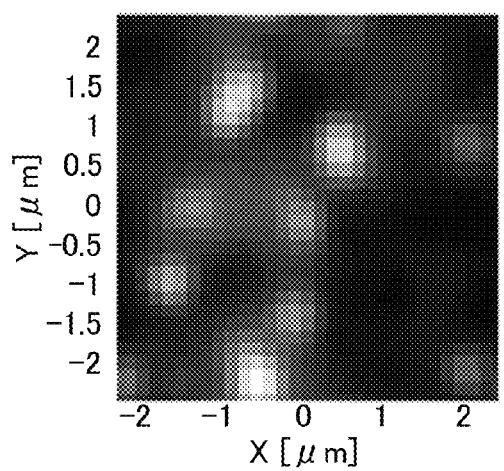
FIG. 12B  Z-STACK IMAGE (Z = 0.0 μm) IN NUMERICAL EXAMPLE 3
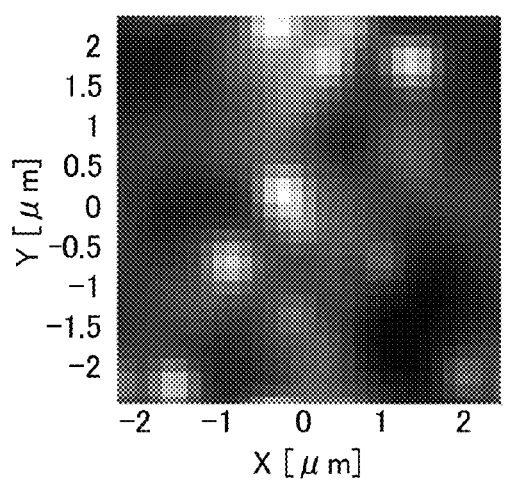
FIG. 12C  Z-STACK IMAGE (Z = +1.1 μm) IN NUMERICAL EXAMPLE 3

BINARIZED VIEW OF RECONSTRUCTED THREE-
DIMENSIONAL LIGHT EMISSION INTENSITY DISTRIBUTION
OF SPECIMEN IN NUMERICAL EXAMPLE 3

RECONSTRUCTED LIGHT EMISSION
INTENSITY DISTRIBUTION OF
SPECIMEN AT Y = 0 IN NUMERICAL
EXAMPLE 3

IMAGE PICKUP APPARATUS, IMAGE PICKUP SYSTEM, AND IMAGE PROCESSING METHOD

TECHNICAL FIELD

The present invention relates to an image pickup apparatus as a microscope including an image sensor.

BACKGROUND ART

As for image data of a pathological specimen (virtual slides), not only horizontal information of the specimen but also its information in the optical axis direction of an imaging optical system (hereinafter the "optical axis direction" for short) is an important material for pathological diagnosis. Accordingly, a conventional method for a microscope changes the focus position in the optical axis direction of the imaging optical system, thereby acquiring a plurality of images (Z-stack images) of the specimen.

In order to observe in detail the specimen structure in the optical axis direction, space intervals at which the focus position is changed when acquiring Z-stack images, need to be small enough. Hereinafter, unless otherwise specified, Z-stack images are acquired with different focus positions at equal space intervals, and the interval is called a "focusing step". The sampling theorem is known as a standard to determine the focus step. When this is applied to the acquisition of Z-stack images, the inverse of the focus step needs to be twice or more the maximum value of the spatial frequency in the optical axis direction that a three-dimensional optical image has (the Nyquist condition). Hereinafter, only the focus step (the sampling interval in the optical axis direction) is subject to the Nyquist condition, and for horizontal directions, which are perpendicular to the optical axis direction, the Nyquist condition is disregarded. The spatial frequency of the optical image is a frequency range in which the spectrum has a non-zero value obtained by performing a discrete Fourier transform for the intensity distribution data of the optical image. If the focusing step is determined according to the Nyquist condition, the focusing step will be a relatively small value on the order of the wavelength of the illumination light, so that the data volume of Z-stack images is enormous. This method results in an increase in the cost of hardware related to the acquisition, processing, and storing of images and an increase in processing time.

Subjected to the resolving power defined by the optical system of the microscope, acquired images of a specimen are degraded relative to the actual specimen. In order to restore these degraded images, PLT1 restores an image by image processing without considering the sparseness of a specimen, but the resolution of acquired Z-stack images and the resolution of restored images are the same. As a time period required to acquire Z-stack images is shortened with a larger focusing step, the resolution in the optical axis direction of the specimen degrades accordingly. Further, if the Nyquist condition is not satisfied, aliasing (fold distortion) occurs, resulting in the occurrence of a false pattern in the structure in the optical axis direction in Z-stack images. One solution for this problem is the interpolation that increases the resolution in the optical axis direction of the Z-stack images, but according to the sampling theorem, the correctness of interpolation is not ensured when the Nyquist condition is not satisfied.

Accordingly, there has been growing interest in a novel signal processing technique referred to as compressed sensing or compressive sensing in these years. The compressive sensing is a technique which accurately reconstructs information about an object subject to observation from data sampled without the Nyquist condition being satisfied.

For example, NPLT1 discloses a method of reconstructing three-dimensional shape information of a specimen from one image by applying the compressive sensing to a hologram. PLT2 discloses a method which, with an improvement in the optical element or image pickup element, generates an image from which the amount of information obtained is not essentially reduced even when the sampling interval is increased, to reconstruct an image higher in resolution than an acquired image (a super-resolution process). PLT3 discloses a method of optimizing an objective function including a noise suppression term and a sparse regularization term in a tomographic image acquiring apparatus such as an MRI (Magnetic Resonance Imaging) for the image reconstruction. This method uses a regularization with the sparseness of a solution as prior information, and provides a highly accurately reconstruction with a reduced number of acquired data if the three-dimensional information of a specimen is sparse (the number of non-zero elements is small).

NPLT2 describes imaging by a microscope, and NPLT3 describes the accuracy of reconstruction in the compressive sensing. NPLT4 describes a TwIST algorithm, and NPLT5 describes a weak-object optical transfer function.

CITATION LIST

Patent Literature

[PTL 1] U.S. Patent Application, Publication No. 2010/0074486
[PTL 2] U.S. Pat. No. 7,532,772
[PTL 3] U.S. Patent Application, Publication No. 2011/0293158

Non-Patent Literature

[NPLT 1] D. J. Brady, K. Choi, D. L. Marks, R. Horisaki, S. Lim, "Compressive Hoography," Optics Express, USA, Optical Society of America, 2009, Vol. 17, No. 15, p. 13040-13049
[NPLT 2] Y. Sung, C. J. R. Sheppard, "Three-dimensional imaging by partially coherent light under nonparaxial condition," Journal of the Optical Society of America A, USA, Optical Society of America, 2011, Vol. 28, No. 4, p. 554-559
[NPLT 3] D. L. Donoho, M. Elad, V. N. Temlyakov, "Stable recovery of sparse overcomplete representations in the presence of noise," IEEE Transactions on Information Theory, USA, IEEE, 2006, Vol. 52, Issue 1, p. 6-18
[NPLT 4] J. M. Bioucas-Dias, M. A. T. Figueiredo, "A New TwIST: Two-step iterative shrinkage/thresholding algorithms for image restoration," IEEE Transactions on Image Processing, USA, IEEE, 2007, Vol. 16, Issue 12, p. 2992-3004
[NPLT 5] C. J. R. Sheppard, X. Q. Mao, "Three-dimensional imaging in a microscope," Journal of the Optical Society of America A, USA, Optical Society of America, 1989, Vol. 6, No. 9, p. 1260-1269

SUMMARY OF INVENTION

Technical Problem

It is difficult for the method of PLT1 to reduce the number of Z-stack images while maintaining the resolution in the optical axis direction of the specimen. It is in principle unable to obtain a resolution higher than that of the obtained image when the focusing step does not satisfy the Nyquist condition. The method of PLT2 uses the compressive sensing, but does not discuss an image reconstruction method for the Z-stack images. It needs a complicated optical element or image sensor, causing an increase of costs of the apparatus. The methods of PLT3 and NPLT1 are silent about a method of improving the image pickup apparatus so as to improve the precision of the reconstruction.

The present invention precisely provides a three-dimensional reconstruction of a specimen with the smaller number of samples in the image pickup apparatus.

Solution to Problem

An image pickup apparatus according to the present invention includes an illumination optical system configured to illuminate a specimen, an imaging optical system configured to form an optical image of the specimen, a light modulator configured to generate at least one of a transmittance distribution and a phase distribution which are asymmetric with respect to an optical axis on a pupil plane of at least one of the illumination optical system and the imaging optical system, an image sensor configured to photoelectrically convert the optical image of the specimen formed by the imaging optical system, and a driver configured to change a relative position along an optical axis direction of the imaging optical system between a focal plane of the imaging optical system and at least one of the specimen and the image sensor. The driver change the relative position in acquiring a plurality of images of the specimen.

Further features and aspects of the present invention will become apparent from the following description of exemplary embodiments with reference to the attached drawings.

Advantageous Effects of Invention

The present invention precisely provides a three-dimensional reconstruction of a specimen with the smaller number of samples in the image pickup apparatus.

BRIEF DESCRIPTION OF DRAWINGS

FIGS. 5A-5C are Z-stack images of Numerical Example 1; (Example 1)

FIGS. 8A-8C are Z-stack images of Numerical Example 2; (Example 2)

FIGS. 12A-12C are Z-stack images of Numerical Example 3; (Example 3) and

DESCRIPTION OF EMBODIMENTS

Figure 1:
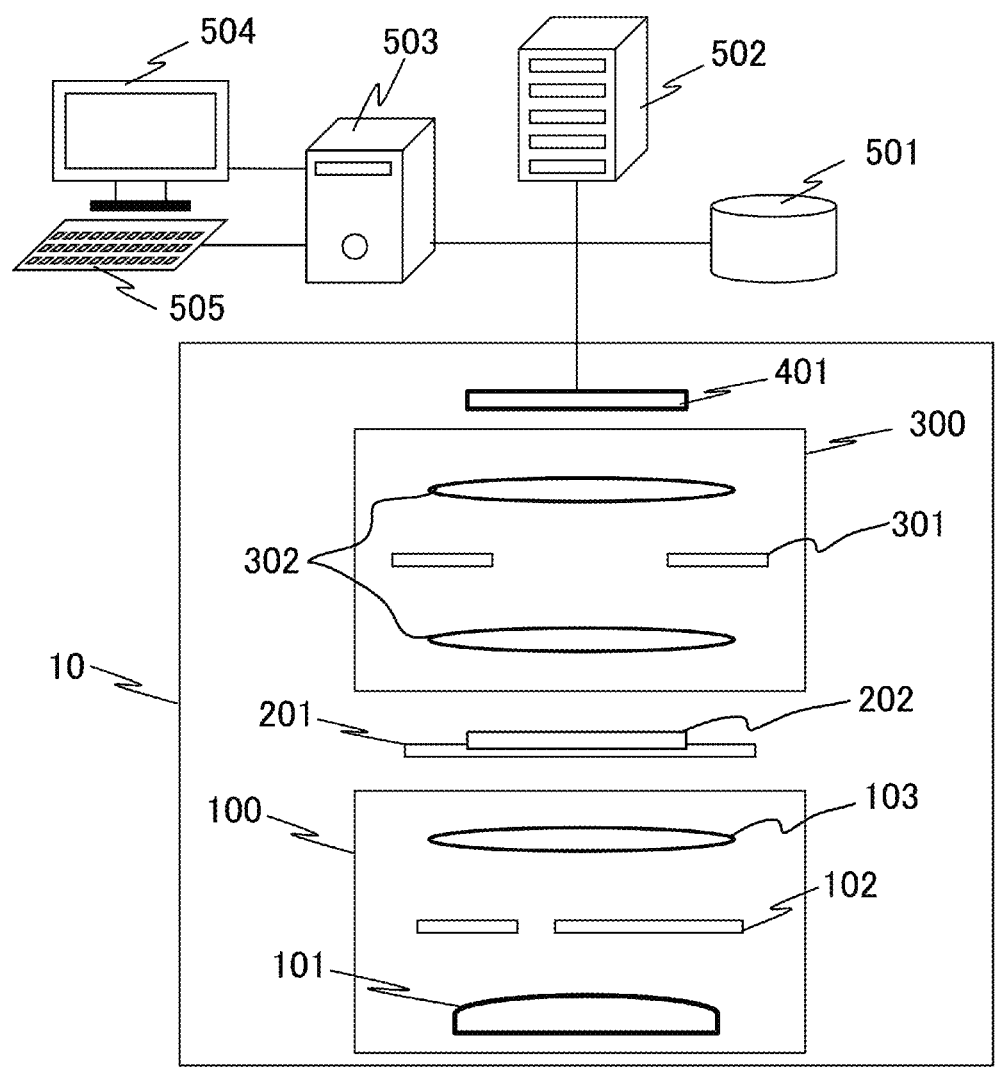
FIG. 1 is a block diagram illustrating the configuration of an image pickup system according to this embodiment.

FIG. 1 is a block diagram illustrating the configuration of an image pickup system according to this embodiment. The present invention can be embodied as an image pickup apparatus, and may also be embodied as an image pickup system that is a combination of an image pickup apparatus and a computer (and further a display unit). Such an image pickup apparatus or image pickup system is suitable for a virtual slide generating system or a digital microscope and very useful for applications such as the pathological diagnosis.

As illustrated in FIG. 1, the image pickup system of this embodiment includes an image pickup apparatus 10 and a computer (PC) 503. A display unit 504 and an input unit 505 are connected to the PC 503. A storage unit 501 and an operating unit 502 are connected to the image pickup apparatus 10 or the PC 503. The system configuration of FIG. 1 is merely illustrative, and the image pickup apparatus 10 and the PC 503 may be integrally combined, so that the image pickup apparatus includes an operating unit. Any or all of the storage unit 501, the operating unit 502, the display unit 504, and the input unit 505 may be integrally combined with the image pickup apparatus 10 or the PC 503.

As illustrated in FIG. 1, the image pickup apparatus 10 includes an illumination optical system 100, a specimen stage 201, an imaging optical system 300, an image sensor 401, and the like. The image pickup apparatus 10 may include a bright field microscope and a fluorescence microscope.

The illumination optical system 100 includes a light source 101, an illumination light modulator 102, and an optical system 103 and illuminates a specimen.

When a specimen is bright field observed, for example, a halogen lamp or an LED (Light Emitting Diode) is used as the light source 101. When a specimen is fluorescence observed, instead of an LED, a xenon lamp or a laser light source may be used.

The illumination light modulator 102 adjusts at least one of the transmittance distribution (intensity distribution of transmitted light) and phase distribution on the pupil plane of the illumination optical system 100. The illumination light modulator 102 may adjust at least one of the transmittance distribution (intensity distribution of transmitted light) and phase distribution on the pupil plane of the illumination optical system 100 each time a driver changes a relative position. The illumination light modulator 102 fixes an effective light source, or the intensity distribution of illumination light on a specimen, at a desired distribution or changes it freely, and, for example, a variable diaphragm, a light shield having an opening, a spatial light modulator, or the like placed close to the pupil plane of the illumination optical system can be used as the illumination light modulator 102.

The effective light source is an image, of emitted light from the illumination light modulator 102, formed on the pupil plane of the imaging optical system in the bright field microscope when there is no specimen, and it is commonly known that the distribution of the effective light source affects the resolving power and the depth of focus. The illumination light modulator 102 is optically conjugate to the pupil plane of the imaging optical system. Although the illumination light modulator 102 of FIG. 1 is shown as a light transmitting element, it may be a reflective element such as a DMD (digital micro-mirror device).

The emitted light from the illumination optical system 100 is led to a specimen 202 mounted on the specimen stage 201. The specimen stage 201 may cooperate with a mechanism (not shown) to put out the specimen 202 after observed and a mechanism (not shown) to take a specimen 202 to be observed next out of a specimen holder such as a cassette and to feed it in so as to automatically observe sequentially a plurality of specimens. However, the specimen 202 does not necessarily need to be automatically replaced, but may be replaced manually. Further, the specimen stage 201 may include a driving unit to displace the specimen 202 minutely in the optical axis direction of the imaging optical system 300. By operating this driving unit to acquire a plurality of images, Z-stack images can be obtained. The specimen 202 may be a preparation in which an object subject to observation such as a piece of tissue is mounted on a slide glass and covered with a light transmitting cover glass to be fixed.

The imaging optical system 300 includes a light modulator 301 and optical elements (lenses) 302 and forms an optical image of a specimen. An element similar to that of the illumination light modulator 102 is used for the light modulator 301, and the light modulator 301 fixes the intensity distribution, phase distribution, or both of the emitted light at a desired distribution or changes it freely. FIG. 1 is a schematic diagram for where a bright field microscope is used, but not being limited to this, a fluorescence microscope may be used, or an imaging optical system of a scheme such as a phase contrast method or a differential interference method can be used.

The image sensor 401 photoelectrically converts the optical image of the specimen 202 formed on the image plane by the imaging optical system 300 and transmits the resulting signal. There may be provided a driving unit to displace the image sensor 401 minutely in the optical axis direction of the imaging optical system 300. By operating this driving unit to acquire a plurality of images, Z-stack images can be obtained. The image sensor 401 is connected to the PC 503 or the storage unit 501 and the operating unit 502 in such a way that it can transmit signals.

Thus, the image pickup apparatus 10 includes a driver to change the relative position in the optical axis direction between the focal plane of the imaging optical system 300 and at least one of the specimen 202 and the image sensor 401 and changes the relative position by the driver to acquire a plurality of images of the specimen 202.

When the three-dimensional information of the specimen 202 is not reconstructed immediately after the image acquisition, the image data is transmitted from the image sensor 401 to the PC 503 or the storage unit 501 and stored there. The three-dimensional information is, for example, data representing three-dimensional distributions of physical quantities such as the refractive index, extinction coefficient, and fluorescent intensity of the specimen 202. When the reconstruction follows the image acquisition immediately, the image data is transmitted to the PC 503 or the operating unit 502, and the three-dimensional information of the specimen 202 is reconstructed. In accordance with a user's instruction via the input unit 505 or information stored in the PC 503, one or both of the displaying process on the display unit 504 and the transmitting process to the PC 503 or the storage unit 501 for storage are performed for the reconstructed data.

Note that all the modules except for the image pickup apparatus 10 in FIG. 1 do not necessarily need to be directly connected to the image pickup apparatus 10. For example, the image pickup apparatus 10 may be connected to a remote server via a LAN (Local Area Network) or a cloud computing service. In this case, the entities of the modules except for the image pickup apparatus 10 exist on the remote server. Advantageously, the reconstruction can be provided even if the image pickup apparatus 10 and peripheral devices such as the operating unit 502 cannot be integrated because of the restrictions in placement and costs. In addition, the operating unit of the latest performance can be always used, and data can be shared between remote sites.

A description will now be given of the reconstruction of the three-dimensional information of the specimen 202 by the PC 503 or the operating unit 502. The operating unit 502 performs a compressive sensing reconstruction algorithm for Z-stack images to reconstruct information of the specimen that has a greater number of data elements than the number of all pixels of the Z-stack images.

Although it is now contemplated that Z-stack images are acquired by displacing the image sensor 401 by a micro distance in the optical axis direction of the imaging optical system. 300, the method may displace the specimen stage 201 by the micro distance. In defining the coordinate system of the image plane, one coordinate axis (here Z axis) in the three-dimensional orthogonal coordinate system is set parallel to the optical axis direction of the imaging optical system 300, Z=0 is set to the position conjugate to the surface of the specimen, and the positive direction is set to the direction from the image plane to the specimen.

A description will now be given of the formulation of imaging by a microscope in the reconstruction process. In a bright field microscope, strictly speaking, a relationship between the specimen and the optical image is non-linear, due to a partially coherent imaging system. However, if the specimen is close to transparent, so that diffracted light fluxes other than the 0-th order are relatively faint as compared with the 0-th order diffracted light (straightforward traveling light), then the linearity can be approximated by ignoring the interferences among the diffracted light fluxes other than the 0-th order. Based upon this assumption, a two-dimensional optical image I(X, Y, Z) on an XY plane of which the Z coordinate is Z is expressed by expressions (1) and (2).

$$I(X,Y,Z)=I_0+\text{Re}[\alpha\iiint C_1(f,g,h)\text{FT}[T(x,y,z)]\exp\{i2\pi(fX+gY+hZ)\}df\,dg\,dh] \quad (1)$$

$$T(x,y,z)=1+i\pi(n_0^2-n(x,y,z)^2) \quad (2)$$

Herein, $n_0$ is a background refractive index, n(x, y, z) is a complex refractive index at a coordinate (x, y, z) inside the specimen, FT is a three-dimensional Fourier transform, (f, g, h) is a three-dimensional coordinate in a frequency space, (X, Y, Z) is a three-dimensional coordinate near the image plane, and Re is an operation outputting a real part of a complex number. The background refractive index is the refractive index of light transmitting material uniformly filling the space between structures. In the case of a pathological specimen, the refractive index of a light transmitting material uniformly filled in the space between the cover glass and the slide glass, such as an encapsulant or an intercellular substance inside a piece of tissue. The real part of the complex refractive index denotes a refractive index, the imaginary part denotes an extinction coefficient, and T is commonly called a scattering potential. $C_1(f, g, h)$ is a three-dimensional function in the frequency space, referred to as a weak-object optical transfer function, and is uniquely determined from the effective light source and the pupil function of the imaging optical system 300. The effective light source is an intensity distribution defined in a two-dimensional coordinate plane of f, g, and the pupil function is a complex transmittance distribution defined in the two-dimensional coordinate plane of f, g. The absolute value of the complex value of each point of the pupil function denotes amplitude transmittance, and the argument thereof denotes the relative variation amount of phase in transmitted light. $I_0$ is a constant representing background light having a uniform intensity over the entire surface, and α is a constant determined from the product of the sampling interval of (f, g, h) and the complex conjugate of the value at the origin of the three-dimensional Fourier spectrum of T. NPLT2 describes the expression (1) in more detail.

In order to enable numerical calculation, (f, g, h) is set to discrete coordinates spaced at regular intervals, the triple integral in the expression (1) is rewritten as a sum, and FT is defined as a three-dimensional discrete Fourier transform. As a result, the expression (1) is rewritten using the product of matrices and a vector as illustrated in expressions (3) to (7).

I in the expression (3) is an $(N_x \times N_y \times N) \times 1$ vector (an M×1 vector obtained by combining a plurality of images and subtracting a constant) containing the luminance values of all the pixels of Z-stack images determined by the expression (1) for these Z's. "n" is an $(N_x \times N_y \times N_z) \times 1$ vector (an N×1 vector representing the three-dimensional refractive index distribution of the specimen 202), and • is an operator for taking the element-wise product of matrices (the Hadamard product). ΦB is an $(N_x \times N_y \times N) \times (N_x \times N_y \times N_z)$ complex matrix (an M×N matrix). T is an $(N_x \times N_y \times N_z) \times 1$ vector (an N×1 vector representing three-dimensional information of the specimen 202) defined by the expression (4). 1 is an $(N_x \times N_y \times N_z) \times 1$ vector having all elements of 1.

As understood from the expression (3), there is a linear relationship between the scattering potential T that is three-dimensional information of the specimen and the Z-stack images I. The linear relationship between observed data and the reconstruction object and the smaller number of elements of observed data than the number of elements of the reconstruction object can provide an accurate reconstruction of specimen information only when compressive sensing is applied. The number of elements refers to, but is not limited to, the number of numerical values in the data or the dimension number of the vector, such as the number of pixels of an image or the number of values representing the refractive index distribution of a specimen. Of course, the reconstruction can be provided where the number of elements of observed data is the same as or larger than the number of elements in the reconstruction object.

The fluorescence microscope is known as incoherent imaging, and a two-dimensional optical image I(X, Y, Z) on an XY plane with the Z coordinate of Z is expressed by expression (8).

$$I = I_0 + \mathrm{Re}[\alpha \Phi_B T] = I_0 + \Phi T \tag{3}$$

$$T = \begin{pmatrix} T(x_1, y_1, z_1) \\ \vdots \\ T(x_{Nx}, y_{Ny}, z_{Nz}) \end{pmatrix} = 1 + i\pi(n_0^2 1 - n \cdot n) \tag{4}$$

$$\Phi_B = \begin{pmatrix} \Phi_{11} & \cdots & \Phi_{1Nz} \\ \vdots & \ddots & \vdots \\ \Phi_{N1} & \cdots & \Phi_{NNz} \end{pmatrix} \begin{pmatrix} C_1(f_1, g_1, h_1) & & 0 \\ & \ddots & \\ 0 & & C_1(f_{Nx}, g_{Ny}, h_{Nz}) \end{pmatrix} F \tag{5}$$

$$F = \begin{pmatrix} \exp\{-i2\pi(f_1 x_1 + g_1 y_1 + h_1 z_1)\} & \cdots & \exp\{-i2\pi(f_1 x_{Nx} + g_1 y_{Ny} + h_1 z_{Nz})\} \\ \vdots & & \vdots \\ \exp\{-i2\pi(f_{Nx} x_1 + g_{Ny} y_1 + h_{Nz} z_1)\} & \cdots & \exp\{-i2\pi(f_{Nx} x_{Nx} + g_{Ny} y_{Ny} + h_{Nz} z_{Nz})\} \end{pmatrix} \tag{6}$$

$$\Phi_{jk} = \frac{1}{N_x N_y N_z} \begin{pmatrix} \exp\{i2\pi(f_1 X_1 + g_1 Y_1 + h_k Z_j)\} & \cdots & \exp\{i2\pi(f_{Nx} X_1 + g_{Ny} Y_1 + h_k Z_j)\} \\ \vdots & & \vdots \\ \exp\{i2\pi(f_1 X_{Nx} + g_1 Y_{Ny} + h_k Z_j)\} & \cdots & \exp\{i2\pi(f_{Nx} X_{Nx} + g_{Ny} Y_{Ny} + h_k Z_j)\} \end{pmatrix} \tag{7}$$

In the three coordinate systems (x, y, z), (X, Y, Z), (f, g, h), assume that $N_x \times N_y \times N_z$ is the number of coordinate points used to calculate the expression (1). For example, using $N_x$ coordinate points $\{f_1, f_2, \ldots, f_{Nx}\}$ on the f axis, the matrices of the expressions (5) to (7) are formed. Further, assume that $\{Z_1, Z_2, \ldots, Z_N\}$ are individual Z coordinate points used to acquire N Z-stack images and Z in the expression (1) is set to one of them.

$$I(X,Y,Z) = \iiint \mathrm{OTF}(f,g,h) \mathrm{FT}[O(x,y,z)] \exp\{i2\pi(fX+gY+hZ)\} df\, dg\, dh \tag{8}$$

OTF is an optical transfer function of the imaging optical system 300, and O denotes a fluorescence intensity distribution of the specimen.

Similar to the bright field microscope, the right side of the expression (8) can be written as the product of matrices and a vector as illustrated in expressions (9) to (13), and on the basis of this linearity, compressive sensing can be applied.

$$I = \Phi_F O \tag{9}$$

$$O = \begin{pmatrix} O(x_1, y_1, z_1) \\ \vdots \\ O(x_{Nx}, y_{Ny}, z_{Nz}) \end{pmatrix} \tag{10}$$

$$\Phi_F = \begin{pmatrix} \Phi_{11} & \cdots & \Phi_{1Nz} \\ \vdots & \ddots & \vdots \\ \Phi_{N1} & \cdots & \Phi_{NNz} \end{pmatrix} \begin{pmatrix} OTF(f_1, g_1, h_1) & & 0 \\ & \ddots & \\ 0 & & OTF(f_{Nx}, g_{Ny}, h_{Nz}) \end{pmatrix} F \tag{11}$$

$$F = \begin{pmatrix} \exp\{-i2\pi(f_1 x_1 + g_1 y_1 + h_1 z_1)\} & \cdots & \exp\{-i2\pi(f_1 x_{Nx} + g_1 y_{Ny} + h_1 z_{Nz})\} \\ \vdots & \ddots & \vdots \\ \exp\{-i2\pi(f_{Nx} x_1 + g_{Ny} y_1 + h_{Nz} z_1)\} & \cdots & \exp\{-i2\pi(f_{Nx} x_{Nx} + g_{Ny} y_{Ny} + h_{Nz} z_{Nz})\} \end{pmatrix} \tag{12}$$

$$\Phi_{jk} = \frac{1}{N_x N_y N_z} \begin{pmatrix} \exp\{i2\pi(f_1 X_1 + g_1 Y_1 + h_k Z_j)\} & \cdots & \exp\{i2\pi(f_{Nx} X_1 + g_{Ny} Y_1 + h_k Z_j)\} \\ \vdots & & \vdots \\ \exp\{i2\pi(f_1 X_{Nx} + g_1 Y_{Ny} + h_k Z_j)\} & \cdots & \exp\{i2\pi(f_{Nx} X_{Nx} + g_{Ny} Y_{Ny} + h_k Z_j)\} \end{pmatrix} \tag{13}$$

A description will now be given of a method of reconstructing a three-dimensional distribution of the scattering potential T or the fluorescence intensity distribution O based on the above imaging expression.

In the compressive sensing, observed data is acquired via an encoder as needed, and a reconstruction algorithm follows which estimates a sparse solution based on the observed data. This method provides highly accurately reconstructed data having a larger number of elements than the observed data. This reconstruction algorithm will be hereinafter referred to as a "compressive sensing reconstruction algorithm" or simply a "reconstruction algorithm."

For a successful reconstruction, data as a reconstruction object is desirably sparse. The bright field microscope provides encoding by giving an appropriate transmittance or phase modulation to one or both of the illumination light modulator 102 and the light modulator 301. For example, a highly accurate reconstruction is provided by generating at least one of a transmittance distribution and a phase distribution which are asymmetric with respect to the optical axis on the pupil plane of at least one of the illumination light modulator 102 and the light modulator 301.

In general, the purpose of encoding in the compressive sensing is to obtain observed data that theoretically guarantees the reconstruction accuracy, and it is a conventional method to provide a modulation based on a Gaussian random number. However, for images captured via an optical system, the reconstruction of three-dimensional information of the specimen does not become sufficiently accurate only by providing a modulation based on a Gaussian random number to the amplitude or phase of transmitted light on the pupil plane of the imaging optical system. As evident from the embodiments, the reconstruction accuracy can be improved by providing an asymmetric transmittance or phase distribution as discussed above.

A description will now be given of the reason why a transmittance or phase distribution asymmetric with respect to the optical axis improves the reconstruction accuracy. Assume that $\phi_i$ is an i'-th column vector of $\Phi_B$ or $\Phi_F$, it is generally known that the reconstruction accuracy in the compressive sensing is determined by the coherence $\mu$ defined by expression (14).

$$\mu = \max_{i < j \in \{1, \ldots, N_C\}} \frac{|\langle \phi_i, \phi_j \rangle|}{\|\phi_i\|_2 \|\phi_j\|_2} \tag{14}$$

Herein, $N_C$ is the number of columns of $\Phi_B$ or $\Phi_F$, < > is the inner product, and the denominator on the right side denotes an L2 norm product of the two column vectors. The coherence $\mu$ means the maximum value of the degree of correlation between columns of a matrix representing the observation process. The coherence $\mu$ has a positive real value, and it is said that the closer to zero this value is, the higher the reconstruction accuracy becomes in the compressive sensing. The above asymmetric transmittance distribution consequently reduces the coherence of $\Phi_B$ or $\Phi_F$ and thus can improve the reconstruction accuracy in the compressive sensing. NPLT3 describes the coherence in more detail. The coherence defined by the expression (14) is irrelevant to the optical coherence.

This reconstruction algorithm numerically solves a minimization problem expressed in expression (15) based on matrix $\Phi$ describing the linear relationship between observed data and specimen information, defined by the expression (5) or (11), and on observed data I.

$$\hat{\theta} = \underset{\theta}{\mathrm{argmin}} \|I - \Phi_X \theta\|_2 + \lambda \Psi(\theta) \tag{15}$$

Herein, argmin is an operation that outputs a value of a variable at which a function on the right side has a minimum value, and θ on the left side is an estimated value of the solution that minimizes the function on the right side. The first term on the right side denotes an L2 norm of an estimated residue; $\Phi_X$ is $\Phi_B$ or $\Phi_F$ mentioned above; and θ is T or O mentioned above. The second term on the right side is referred to as a regularization term, and generally uses a function that has a characteristic where the sparser θ is, the smaller value it takes on for the compressive sensing. λ is a constant called a regularization parameter, but its value may be changed in the iterative reconstruction process described later. This regularization term is a critical factor for reconstructing sparse θ highly accurately. Although the L1 norm of θ is typical as Ψ, the TV (Total Variation) norm defined by expression (16) or the function defined by expressions (17) to (19), for example, can also provide the similar effects.

$$\Psi(\theta) = \sum_n \sqrt{\left(\frac{\partial \theta}{\partial x}\bigg|_n\right)^2 + \left(\frac{\partial \theta}{\partial y}\bigg|_n\right)^2} \qquad (16)$$

$$\Psi(\theta) = \sum_n \log\left(\frac{|\theta_n|}{\sigma} + 1\right) \qquad (17)$$

$$\Psi(\theta) = \sum_n \left(1 - \exp\left\{-\frac{|\theta_n|}{\sigma}\right\}\right) \qquad (18)$$

$$\Psi(\theta) = \sum_n \frac{|\theta_n|}{|\theta_n| + \sigma} \qquad (19)$$

Herein, the subscript n of θ indicates a value at a coordinate of an n-th sampling point among $N_x \times N_y \times N_z$ number in the specimen. σ is a constant and preset to an appropriate value for the object.

The TwIST algorithm disclosed in NPLT3, for example, may be used for an algorithm to solve the minimization problem expressed in expression (15). NPLT4 describes the TwIST algorithm in detail. However, the applicable algorithm is not limited, and may be a general algorithm having the purpose of estimating a sparse solution from data obtained through linear observation. Further, the object function is not limited to the expression (15), and an object function having a plurality of regularization terms for example, may be used.

First Embodiment

Figure 2:
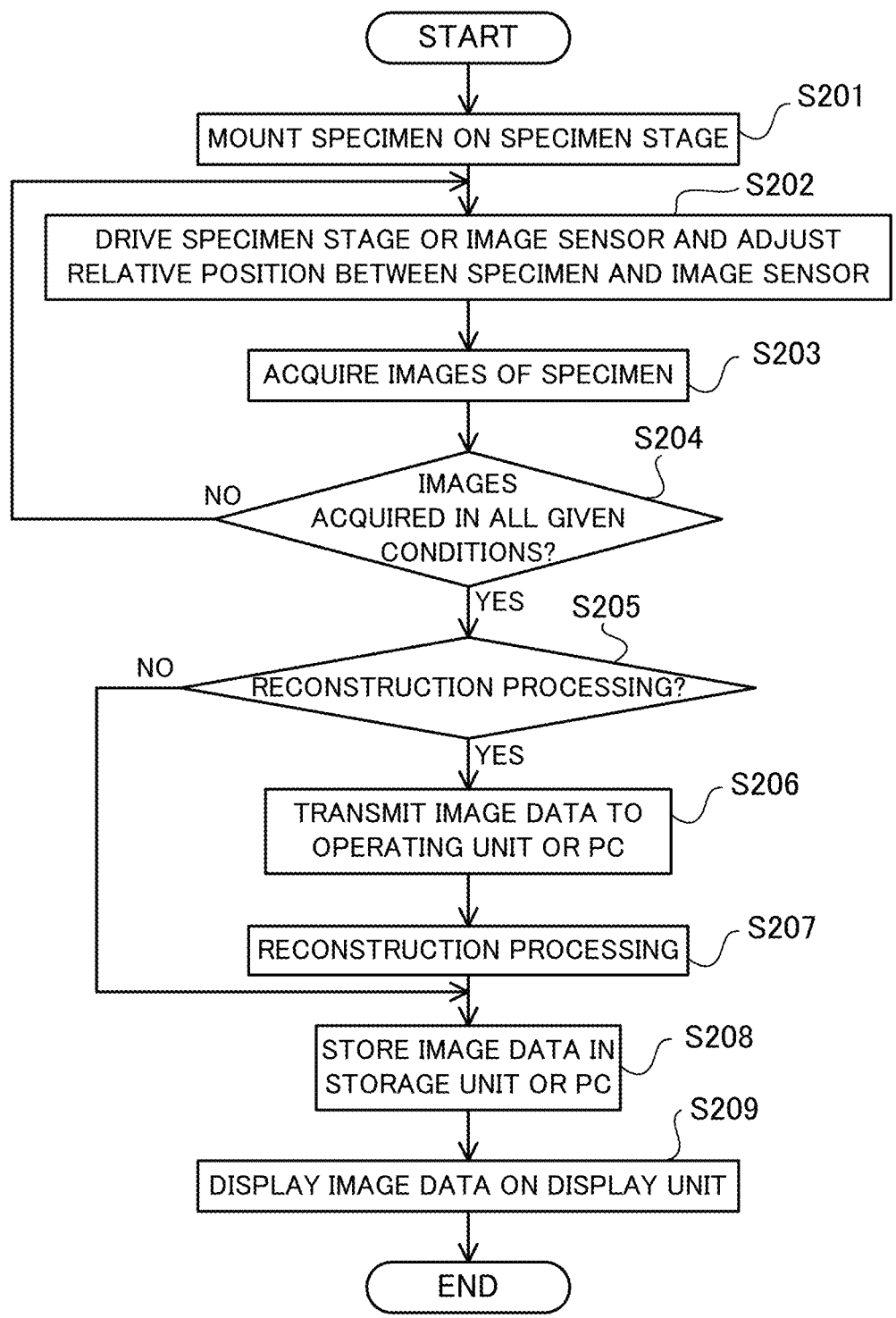
FIG. 2 is a flow chart for explaining operations of the image pickup system illustrated in FIG. 1; (Example 1)

Referring now to FIG. 2, a description will be given of an operation of the acquisition of images of the specimen 202 and the reconstruction of three-dimensional information in the image pickup system illustrated in FIG. 1. In the first embodiment, the image pickup apparatus 10 is a bright field microscope in which the optical characteristic of the illumination light modulator 102 is suitably adjusted to the compressive sensing. FIG. 2 is a flowchart of a processing procedure according to the first embodiment, and "S" stands for the "step." The flowchart illustrated in FIG. 2 can be implemented as a program that enables a computer to realize the function of each step.

In S201, the specimen 202 is mounted on the specimen stage 201. For example, an automatic transporter in association with the specimen stage 201 picks up the specimen 202 out of a specimen holder such as a cassette and mounts it onto the specimen stage 201. This mounting may be performed not automatically but manually by a user.

In S202, the relative position between the focal plane of the imaging optical system 300 and the specimen or the image sensor is adjusted. For example, when the specimen stage 201 includes an accompanying driving unit, the specimen stage 201 is displaced by a micro distance as needed so that the position of the specimen 202 in the optical axis direction of the imaging optical system 300 takes on a set value. Instead, a driving unit attached to the image sensor 401 may minutely displace the image sensor 401 in the optical axis direction of the imaging optical system 300. Alternatively, the relative position of the focal plane to the specimen may be changed by driving a lens of the imaging optical system 300.

In S203, images are acquired. More specifically, while the illumination optical system 100 guides light emitted from the light source 101 to the specimen 202, the image sensor 401 acquires images of the specimen 202 via the imaging optical system 300.

When the transmittance distribution of the illumination light modulator 102 placed near the pupil plane of the illumination optical system 100 is variable and the current state of the illumination light modulator 102 is different from the capturing setting, the illumination light modulator 102 is adjusted to a specified state before S203.

The transmittance distribution of the illumination light modulator 102 may be, for example, asymmetric with respect to the optical axis and the aperture area may be smaller than that of the usual capturing condition in which no compressive sensing is performed. When the image pickup in which compressive sensing is performed follows the usual image pickup in which no compressive sensing is performed, the process proceeds to S203 after the optical characteristic of the illumination light modulator 102 is changed to a state suitable for the compressive sensing.

In the compressive sensing, when the light modulator 301 is placed near the pupil plane of the imaging optical system 300, the optical characteristic thereof may be changed at the same time as that of the illumination light modulator 102.

After S203, if all Z-stack images in the specified condition are not acquired (NO at S204), then S202 and S203 are repeated until all Z-stack images in the specified condition are completely acquired.

Image data acquired in all given conditions (YES at S204) may be temporarily stored in the storage unit 501 or another storage device (not sown) or may be immediately transmitted from the image sensor 401 to the PC 503 or the operating unit 502.

In reconstructing the three-dimensional information of the specimen 202 (YES at S205), in S206 the acquired Z-stack images are transmitted to the PC 503 or the operating unit 502. If reconstruction is not to be performed (NO at S205), in S208 the Z-stack images are transmitted to the storage unit 501 or the PC 503 to be stored.

In S207, the PC 503 or the operating unit 502 performs the reconstruction processing of the three-dimensional information of the specimen 202 based on the acquired image data and information about image pickup conditions. This process may be executed over a plurality of distributed operating units in parallel or may be executed on an operating unit (not shown) connected via a network.

According to this embodiment, the pupil plane of at least one of the illumination optical system and the imaging optical system has at least one of the transmittance distribution (intensity distribution of transmitted light) and the phase distribution which are asymmetric with respect to the optical axis so as to perform the compressive sensing reconstruction algorithm for a plurality of images. Thus, the necessary number of images in S202 and S203 becomes less than that in not applying this embodiment.

In S209 subsequent to S208, the reconstructed three-dimensional information of the specimen 202 is displayed on the display unit 504 in accordance with an instruction from a user or the advance setting. For this display, the reconstructed three-dimensional information is converted into volume data that is a set of color or gray-scaled images. A cross-section of the volume data may be displayed, or a three-dimensional view of the volume data may be displayed by using a rendering function of the PC 503 after it is partially made transparent or separated into a displayed region and a non-displayed region using threshold processing.

In the above procedure, there may be a time lag between capturing and reconstruction processing. For example, the following use case can be expected. Z-stack images acquired by capturing for the compressive sensing for many specimens are stored in the storage unit 501 or the like. Thereafter, the user reconstructs only data of a selected specimen as needed. This method suppresses the data capacity to be stored for a long time, enables a provision of high resolution data of all the specimens, reducing the cost related to data storage.

Next follows a numerical example of the first embodiment.

Numerical Example 1

Figure 3A:
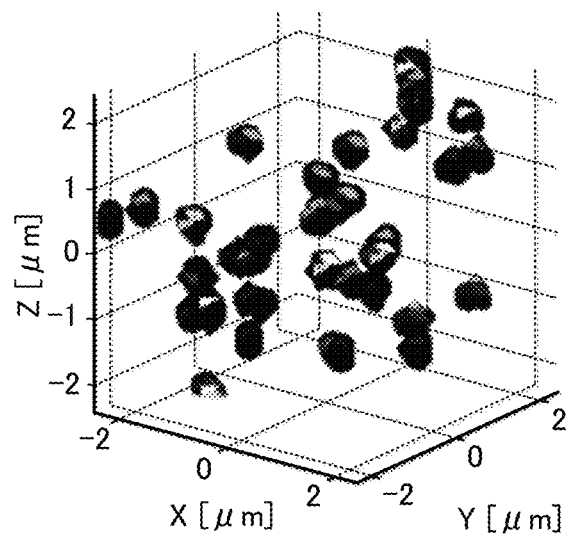
FIGS. 3A-3B are views illustrating the structure and refractive index distribution of a specimen; (Examples 1, 2)
Figure 3B:
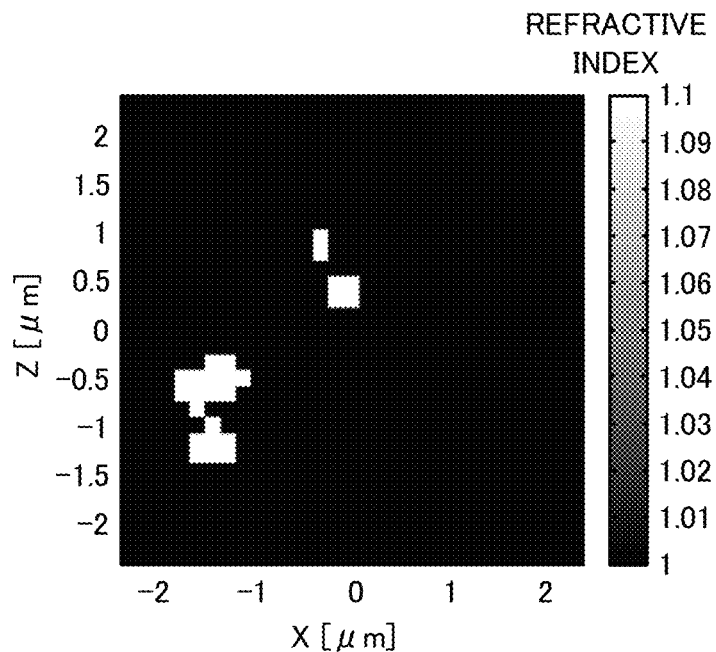

Assume that a wavelength of illumination light irradiated onto the specimen from the illumination optical system 100 is 550 nm, a numerical aperture on the specimen side of the imaging optical system 300 is 0.7, and a magnification is 1.0 times for description convenience. Also, assume that the specimen is a group of particles randomly positioned as illustrated in FIG. 3A. FIG. 3A illustrates a ground truth three-dimensional shape of the specimen. Assume that a particle has a radius of 0.25 μm, a refractive index is 1.1, a background refractive index near the particles is 1.0, and a ratio of volume occupied by all the particles to the space is 2.0%. FIG. 3B illustrates a refractive index distribution on the section of y=0 illustrated in FIG. 3A.

A depth of focus D on the specimen side of the imaging optical system 300 is expressed by expression (20), and the value of D is 0.96 μm under the above conditions.

$$D = \frac{\lambda}{2\left(1 - \sqrt{1 - NA^2}\right)} \quad (20)$$

Herein, λ is a wavelength of the illumination light, NA denotes a numerical aperture on the specimen side of the imaging optical system 300. The depth of focus on the image side is obtained by setting the numerical aperture on the image side to NA in the expression (20). The width along the spatial frequency coordinate h direction of a region where the weak-object optical transfer function has a non-zero value coincides with the inverse of D. The reason for this is described in detail in, e.g., NPLT5.

According to the sampling theorem, it is impossible to accurately reconstruct information of the specimen in the optical axis direction with a resolution equal to or higher than that of the acquisition unless Z-stack images are acquired at intervals smaller than this depth of focus D in the optical axis direction. In the numerical example 1, a variation amount of the relative position of the specimen is larger than the depth of focus D. The image acquisition interval in the Z axis direction or the focusing step being 0.96 μm or less is referred to as the Nyquist condition.

When the image sensor 401 is driven, the depth of focus D' on the image side of the imaging optical system 300 is expressed by expression (21), and in the numerical example 1 the variation amount of the relative position of the image sensor is higher than the depth of focus D'. Herein, NA' denotes a numerical aperture on the image side of the imaging optical system.

$$D' = \frac{\lambda}{2\left(1 - \sqrt{1 - NA'^2}\right)} \quad (21)$$

Assume that Z coordinate points at which Z-stack images are acquired be three points of Z=±1.1 μm, Z=0.0 μm. In other words, three sections through the points of Z=±1.1 μm, Z=0.0 μm and orthogonal to the Z axis are acquired with the image sensor 401 from the three-dimensional light intensity distribution of the specimen 202 formed near the image plane. Although this embodiment discloses the image processing method of acquiring Z-stack images with the effective light source and the pupil function are fixed, the effective light source, the pupil function, or both may be changed each time each of Z-stack images is acquired.

Figure 4A:
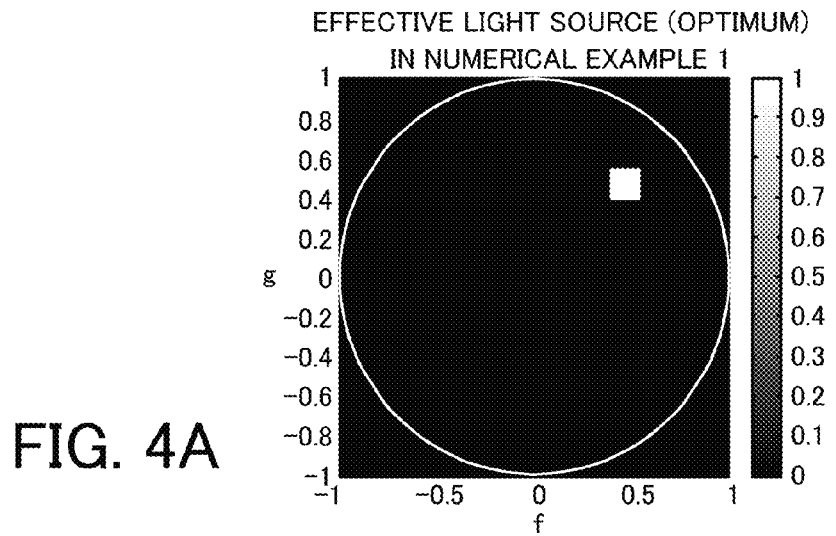
FIGS. 4A-4C are views illustrating the effective light sources of Numerical Example 1 and a conventional example, and the pupil function of an imaging optical system; (Example 1)
Figure 4B:
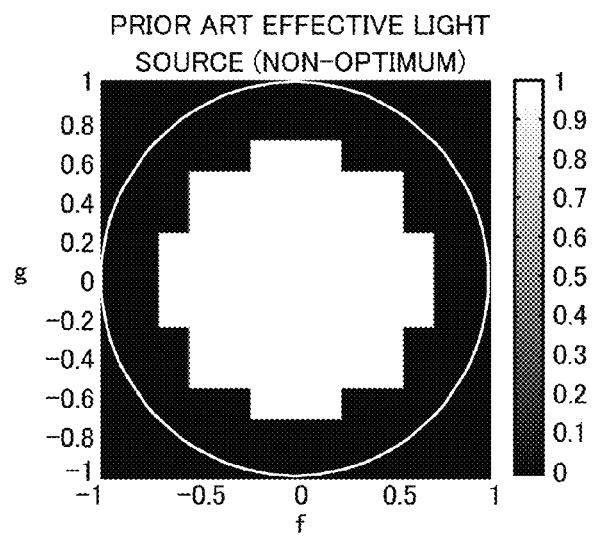
Figure 4C:
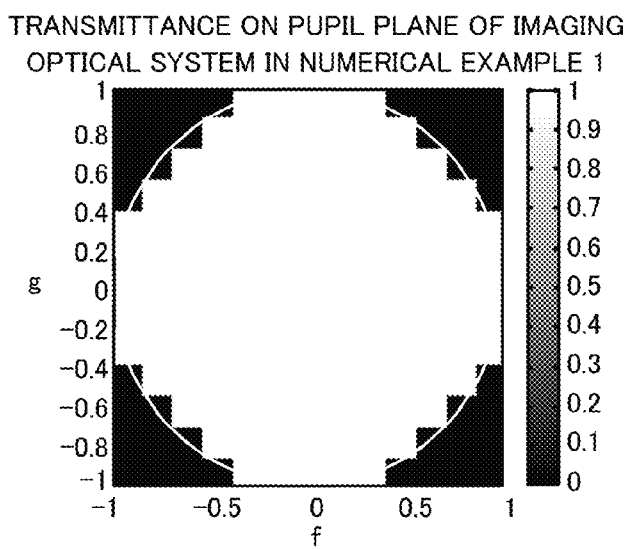

FIG. 4A illustrates the effective light source distribution on the pupil plane of the illumination optical system 100 in the numerical example 1. FIG. 4B illustrates the effective light source distribution on the pupil plane of the illumination optical system 100 in a conventional example. FIG. 4C illustrates the transmittance distribution on the pupil plane of the imaging optical system 300 in the numerical example 1. The effective light source, with the white portion illustrated in FIG. 4A emitting light with uniform intensity, has a transmittance distribution with a monopole at a position offset from the optical axis. The area of the monopole is equal to or narrower than a circle having a diameter d, and the value of d is 1% to 20% of the radius of the pupil. Assume that the pupil function of the imaging optical system 300 provides the white portion illustrated in FIG. 4C that transmits light with uniform intensity. The coordinate axes f, g of FIGS. 4A-4C represent normalized values obtained by dividing the spatial frequencies along X and Y directions by NA/λ. Although the effective light source illustrated in FIGS. 4A-4C is close to coherent illumination because its light emitting portion is relatively small, the light emitting portion of the effective light source can be made larger.

The coherence μ of matrix $\Phi_B$ with the effective light source of FIG. 4A has a value of 0.0048 for the real part of $\Phi_B$ and a value of 0.0032 for the imaginary part of $\Phi_B$. The coherence μ of matrix $\Phi_B$ with the effective light source of FIG. 4B has a value of 8.4003 for the real part of $\Phi_B$ and a value of 1.1680 for the imaginary part of $\Phi_B$. Thus, it can be inferred that the reconstruction accuracy is higher with the effective light source of FIG. 4A.

FIGS. 5A-5C illustrate three Z-stack images acquired from the three-dimensional light intensity distribution calculated based on the expression (3) under the optical system conditions illustrated in FIGS. 4A and 4C. FIG. 5A illustrates an image of Z=−1.1 μm. FIG. 5B illustrates an image of Z=0.0 μm. FIG. 5C illustrates an image of Z=+1.1 μm. Hereinafter, the effective light source refers to the intensity distribution of transmitted light emitted from the illumination light modulator 102. Similarly, the pupil function means a transmittance distribution of the light modulator 301.

A solution of the expression (15) is calculated based on the expression (3) using the TwIST algorithm from these three Z-stack images. The operating unit 502 that performs the reconstruction processing may be integrally combined with the image pickup apparatus 10 or connected to it via a network.

Figure 6A:
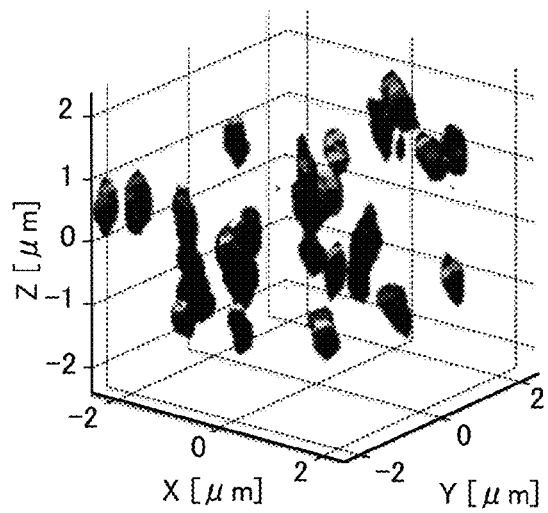
FIGS. 6A-6B are views illustrating the specimen reconstructed in Numerical Example 1; (Example 1)
Figure 6B:
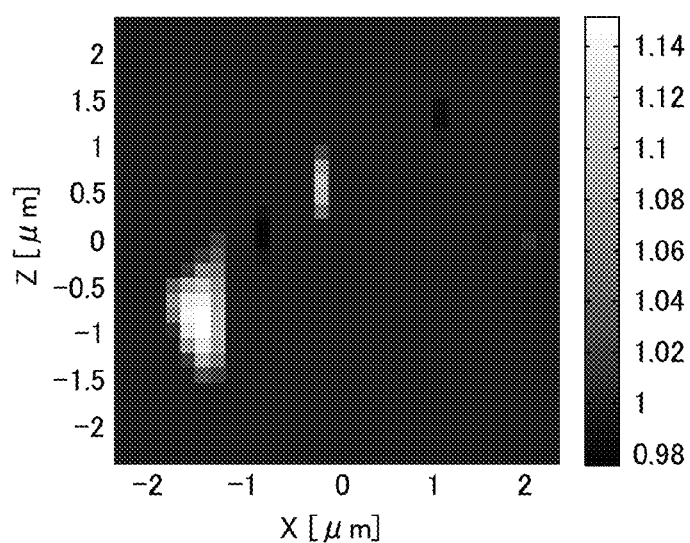

FIG. 6A illustrates a binarized result using 30% of a maximum value as a threshold, the three-dimensional refractive index distribution reconstructed with the regularization term of the expression (15) as an L1 norm and the regularization parameter as 5E-5. This indicates that the three-dimensional shape information of the specimen 202 can be reconstructed from Z-stack images that do not satisfy the Nyquist condition. FIG. 6B illustrates a reconstructed refractive index distribution on the section through y=0. For the quantitative evaluation of this, an RMSE (Root Mean Square Error) given by the expression (21) is defined.

$$RMSE = \sqrt{\frac{1}{N_x N_y N_z} \sum_{x,y,z} |n_2(x, y, z) - n_1(x, y, z)|^2} \quad (22)$$

Herein, $n_1$ is a ground truth three-dimensional refractive index distribution of the specimen 202, and $n_2$ is a reconstructed refractive index distribution. A value of the RMSE for the reconstructed refractive index distribution in FIGS. 6A-6B is 1.09E-2.

When the conventional effective light source of the illumination optical system illustrated in FIG. 4B and the pupil function of the imaging optical system 300 illustrated in FIG. 4C are used, a value of the RMSE is 1.23E-2. Thus, the three-dimensional refractive index distribution of the specimen 202 can be reconstructed within a certain error range from Z-stack images that do not satisfy the Nyquist condition, and the error is reduced by encoding using the effective light source asymmetric with respect to the optical axis.

Second Embodiment

Referring now to FIG. 2, a description will be given of an operation of the acquisition of images of the specimen 202 and the reconstruction of three-dimensional information in the image pickup system illustrated in FIG. 1. In the second embodiment, the image pickup apparatus 10 is a bright field microscope in which the optical characteristic of the light modulator 301 is suitably adjusted to the compressive sensing. A description of the same operation as that of the first embodiment will be omitted.

After S201 and S202 in FIG. 2, while the illumination optical system 100 guides light emitted from the light source 101 to the specimen 202, the image sensor 401 acquires images of the specimen 202 via the imaging optical system 300 (corresponding to S203 in FIG. 2). Herein, if an optical characteristic (the transmittance or phase modulation amount) of the light modulator 301 placed near the pupil plane of the imaging optical system 300 is variable and the current state of the light modulator 301 is different from the capturing setting, the light modulator 301 is adjusted to a specified state before S203. At this time, the transmittance or phase distribution of the light modulator 301 may be asymmetric with respect to the optical axis. When the image pickup in which compressive sensing is performed follows the usual image pickup in which no compressive sensing is performed, the process proceeds to S203 after the optical characteristic of the light modulator 301 is changed to a state suitable for the compressive sensing. In the compressive sensing, the optical characteristic of the illumination light modulator 102 may be placed near the pupil plane of the illumination optical system 100 and changed at the same time as that of the light modulator 301. The operation after this is the same as that in the first embodiment.

Next follows a numerical example of the second embodiment.

Numerical Example 2

The wavelength, the numerical aperture, the magnification, the Nyquist condition, the specimen, and Z coordinate points at which Z-stack images are acquired, are the same as those of the first embodiment. In the effective light source, the white portion illustrated in FIG. 7A emits light with uniform intensity. Assume that the pupil function of the imaging optical system 300 has the transmittance distribution illustrated in FIG. 7B and the phase distribution in radians illustrated in FIG. 7C. Each point of the phase distribution of FIG. 7C is generated independently by normal random numbers with a standard deviation $\pi$. Such a pupil of the imaging optical system can be realized by using, for example, a liquid crystal spatial light modulator or the like. The coordinate axes f, g of FIGS. 7A-7C represent normalized values obtained by dividing the spatial frequencies along X and Y directions by NA/$\lambda$.

Figure 7A:
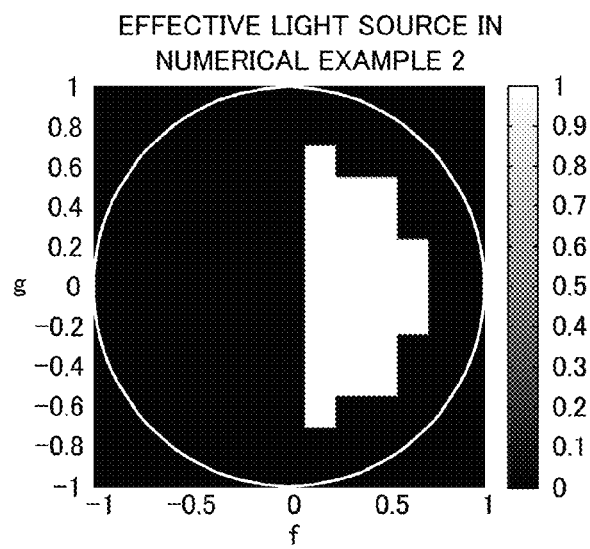
FIGS. 7A-7C are views illustrating the effective light source of Numerical Example 2 and the pupil function of an imaging optical system; (Example 2)
Figure 7B:
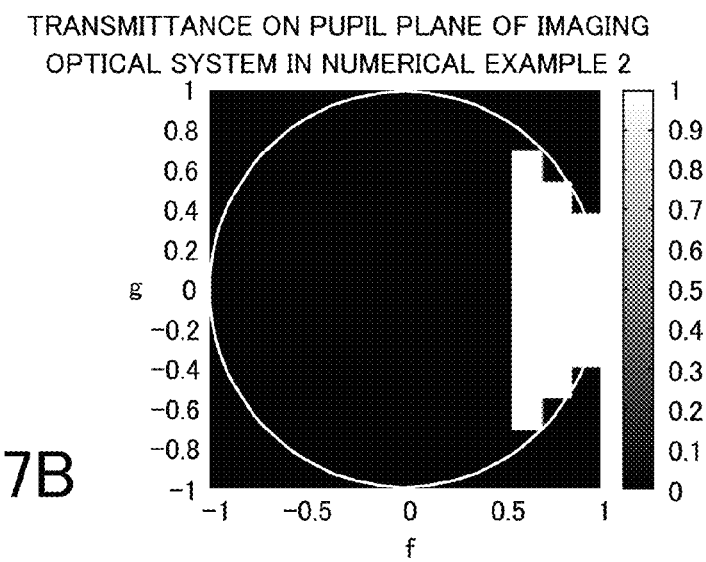
Figure 7C:
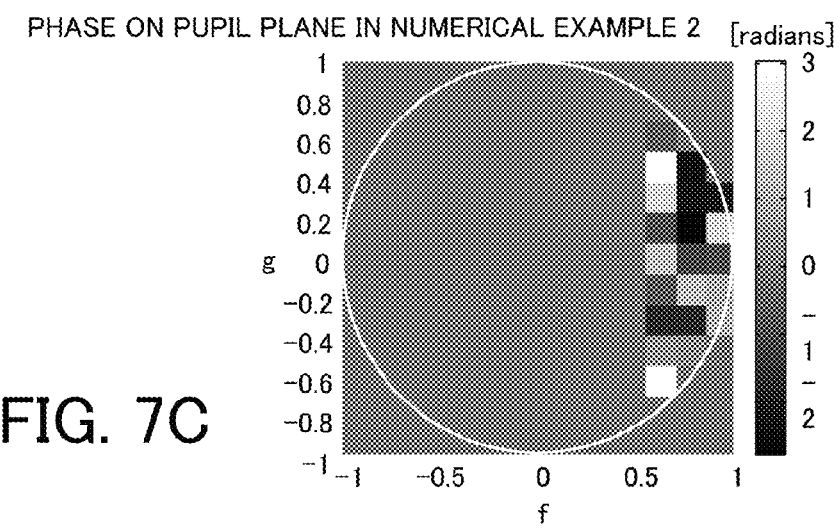

The coherence $\mu$ of matrix $\Phi_B$ with the effective light source and the pupil function of FIGS. 7A-7C has a value of 0.0083 for the real part of $\Phi_B$ and a value of 0.0080 for the imaginary part of $\Phi_B$. The coherence $\mu$ of matrix $\Phi_B$ with the effective light source and the pupil function of FIGS. 7A-7B and the phase distribution of FIG. 7C replaced with a uniform distribution has a value of 0.1056 for the real part of $\Phi_B$ and a value of 0.1016 for the imaginary part of $\Phi_B$. Thus, it can be inferred that the reconstruction accuracy is improved by the phase distribution as well as the transmittance distribution of the pupil plane having asymmetry.

FIGS. 8A-8C illustrate three Z-stack images acquired from the three-dimensional light intensity distribution calculated based on the expression (3) under these conditions. FIG. 8A illustrates an image of Z=−1.1 μm. FIG. 8B illustrates an image of Z=0.0 μm. FIG. 8C illustrates an image of Z=+1.1 μm.

Figure 9A:
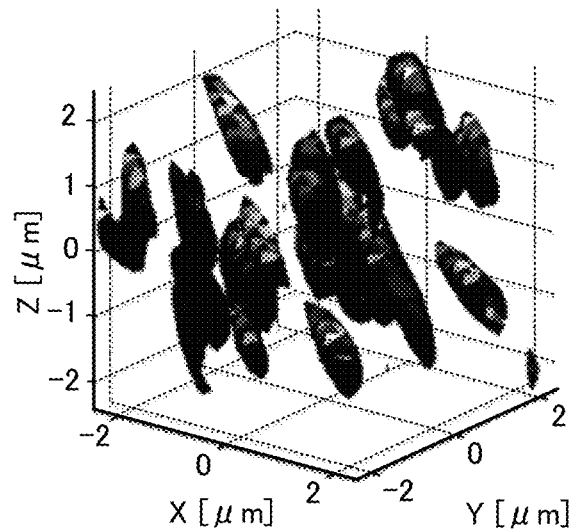
FIGS. 9A-9B are views illustrating the specimen reconstructed in Numerical Example 2; (Example 2)
Figure 9B:
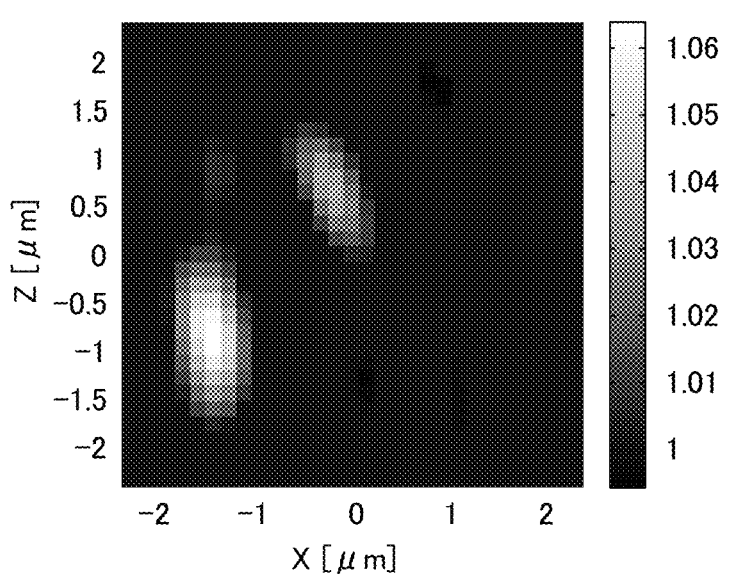

A solution of the expression (15) is calculated based on the expression (3) using the TwIST algorithm from these three Z-stack images. The expression (15) is the same as that of the first embodiment. FIG. 9A illustrates a result of binarizing the reconstructed three-dimensional refractive index distribution using 30% of its maximum value as a threshold. This indicates that the three-dimensional shape information of the specimen 202 can be reconstructed from Z-stack images that do not satisfy the Nyquist condition. FIG. 9B illustrates the reconstructed refractive index distribution on the section through y=0. A value of the RMSE for the reconstructed refractive index distribution of FIGS. 9A-9B is 1.13E-2. A value of the RMSE for the refractive index distribution reconstructed with the phase distribution of FIG. 7C being replaced with a uniform distribution is 1.29E-2. As understood from FIGS. 9A-9B, the three-dimensional refractive index distribution of the specimen 202 can be reconstructed within a certain error range from Z-stack images not satisfying the Nyquist condition, and further the error is reduced by using the pupil function asymmetric with respect to the optical axis.

Third Embodiment

A description will now be given of an operation of the acquisition of images of the specimen 202 and the reconstruction of three-dimensional information when the image pickup apparatus 10 illustrated in FIG. 1 is a fluorescence microscope. A description of the same operation as that of the first embodiment will be omitted.

The specimen 202 is dyed for fluorescence observations, and a specific area where fluorescent dye exists emits light in response to the illumination light as described later.

In general, the fluorescence microscope does not include an illumination light modulator 102 such as a diaphragm in the illumination optical system 100. After only the light modulator 301 is adjusted as needed, the image sensor 401 acquires images of the specimen 202 via the imaging optical system 300 (an equivalent to S203 in FIG. 2). As stated for the first embodiment, the pupil function may be changed each time each of Z-stack images is acquired.

Next follows a numerical example of third embodiment.

Numerical Example 3

Figure 10A:
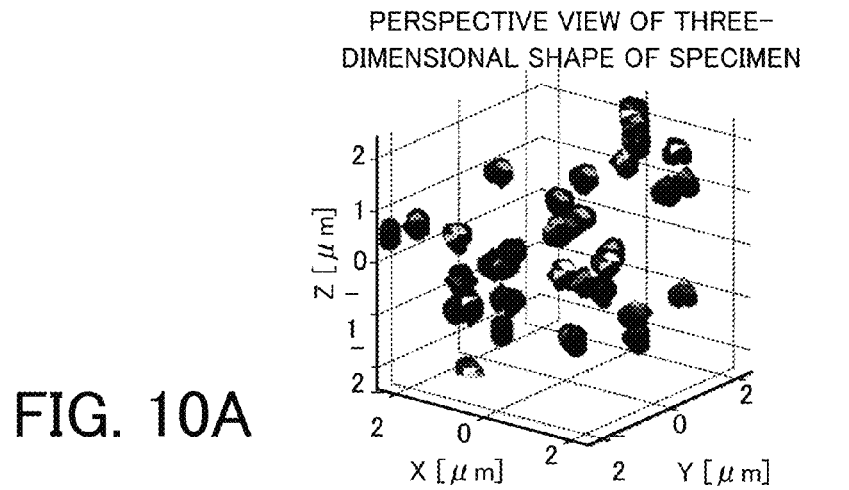
FIGS. 10A-10B are views illustrating the structure and light emission intensity distribution of a specimen; (Example 3)
Figure 10B:
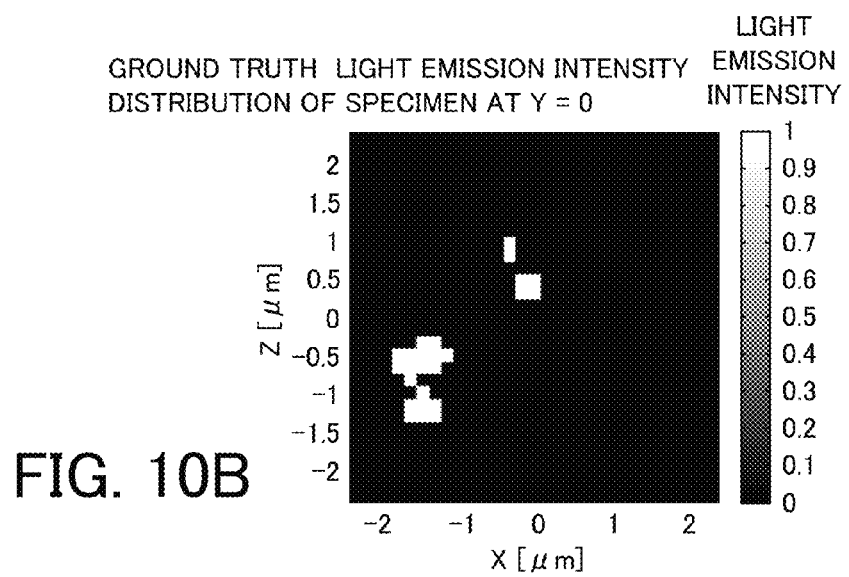

Assume that the image pickup apparatus 10 is a fluorescence microscope, the wavelength of monochromatic light emitted by fluorescent dye is 550 nm, the numerical aperture on the specimen side of the imaging optical system 300 is 0.7, and the magnification be 1.0 times for description convenience. The Nyquist condition is the same as that of the first embodiment. Assume that the specimen is a group of particles randomly positioned as illustrated in FIG. 10A. Assume that the radius of a particle is 0.25 µm and a ratio of volume occupied by all the particles to the space is 2.0%. Only the particles emit light with an intensity of 1 (in an arbitrary unit) and the background behind the particles does not emit light at all. FIG. 10B illustrates a light emission intensity distribution on the section through y=0 illustrated in FIG. 10A.

Assume that Z coordinate points at which Z-stack images are acquired are three points of Z=±1.1 µm, Z=0.0 µm. In other words, three sections through the points of Z=±1.1 µm, Z=0.0 µm and orthogonal to the Z axis of the three-dimensional light intensity distribution of the specimen 202 formed near the image plane are acquired with the image sensor 401.

Figure 11:
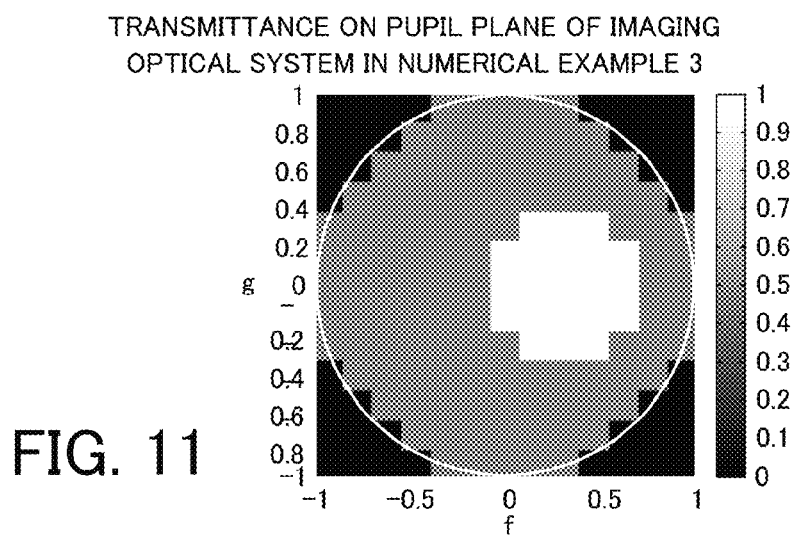
FIG. 11 is a view illustrating the pupil function of an imaging optical system of Numerical Example 3; (Example 3)

FIGS. 12A-12C illustrate three Z-stack images acquired from the three-dimensional light intensity distribution calculated based on the expression (9) when the pupil plane of the imaging optical system 300 has the transmittance distribution illustrated in FIG. 11. FIG. 12A is an image of Z=−1.1 µm. FIG. 12B is an image of Z=0.0 µm. FIG. 12C is an image of Z=+1.1 µm. In the fluorescence observation, the effective light source does not have an influence due to the incoherent imaging system and this embodiment uniformly illuminates the specimen using excitation light to cause light emission at the aforementioned wavelength.

Figure 13A:
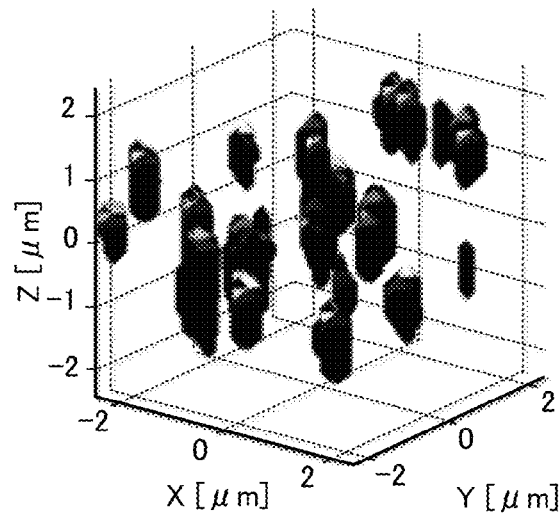
FIGS. 13A-13B are views illustrating the specimen reconstructed in Numerical Example 3. (Example 3)
Figure 13B:
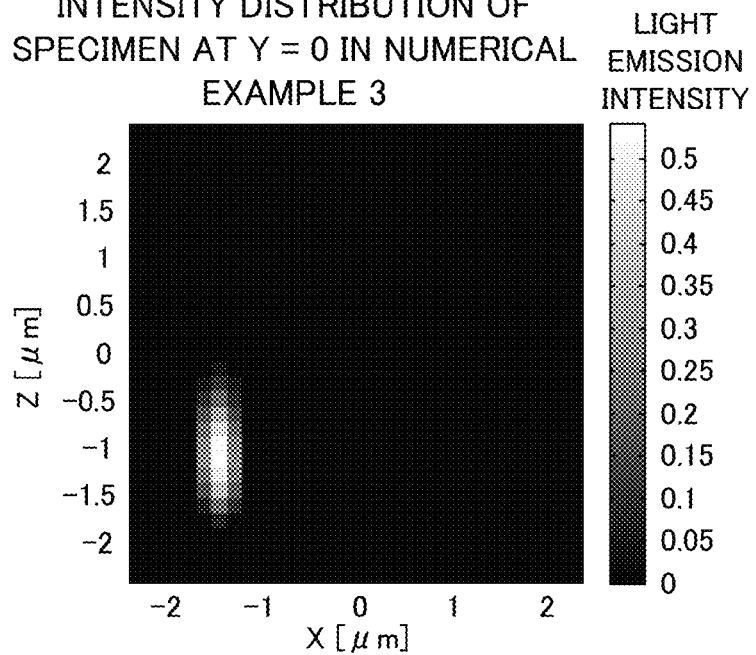

The solution of the expression (15) is calculated based on the expression (9) using the TwIST algorithm from these three Z-stack images. The binarized result using 1% of the maximum value as the threshold, the three-dimensional light emission intensity distribution reconstructed with the regularization term of the expression (15) as a TV norm and the regularization parameter as 1E-4 is illustrated in FIG. 13A. FIG. 13B illustrates the reconstructed light emission intensity distribution on the cross-section going through y=0. The value of the RMSE for the reconstructed light emission intensity distribution of FIGS. 13A-13B is 1.31E-2. The value of the RMSE when the pupil has a uniform transmittance distribution is 1.35E-2, and thus the transmittance distribution asymmetric with respect to the optical axis is effective in reconstruction. When comparing FIGS. 13A-13B and FIGS. 10A-10B, it is understood that the three-dimensional shape information of the specimen 202 can be estimated from Z-stack images not satisfying the Nyquist condition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-007453, filed on Jan. 18, 2013 which is hereby incorporated by reference herein in its entirety.

INDUSTRIAL APPLICABILITY

The present invention is applicable to an image pickup apparatus configured to acquire three-dimensional information of a specimen such as a virtual slide generating system and a digital microscope.

REFERENCE SIGNS LIST 10 image pickup apparatus
100 illumination optical system
202 specimen
300 imaging optical system
401 image sensor

The invention claimed is:

1. An image pickup apparatus comprising:
an illumination optical system configured to illuminate a specimen;
an imaging optical system configured to form an optical image of the specimen;
a light modulator configured to generate at least one of a transmittance distribution and a phase distribution which are asymmetric with respect to an optical axis on a pupil plane of at least one of the illumination optical system and the imaging optical system;
an image sensor configured to photoelectrically convert the optical image;
a driver configured to change a relative position along an optical axis direction of the imaging optical system between a focal plane of the imaging optical system and at least one of the specimen and the image sensor; and
an operating unit configured to reconstruct information of the specimen,
wherein the driver changes the relative position in acquiring a plurality of images of the specimen,
wherein the illumination optical system and the imaging optical system form a partially coherent imaging system, and
wherein the operating unit is configured to perform a compressive sensing reconstruction algorithm for the plurality of images using the following expressions:

$$I = \Phi T$$

$$T = 1 + i\pi(n_0^2 1 - n \cdot n)$$

where I is a M×1 vector obtained by combining the plurality of images and subtracting a constant, $\phi$ is a M×N matrix determined from the illumination optical system and the imaging optical system, T is a N×1 vector representing three-dimensional information of the specimen, n is an N×1 vector representing a three-dimensional refractive index distribution of the specimen, $n_0$ is a background refractive index of the specimen, • is an operator for taking the Hadamard product, and 1 is an N×1 vector having all elements of 1.

2. An image pickup apparatus comprising:
an illumination optical system configured to illuminate a specimen;
an imaging optical system configured to form an optical image of the specimen;
a light modulator configured to generate at least one of a transmittance distribution and a phase distribution which are asymmetric with respect to an optical axis on a pupil plane of at least one of the illumination optical system and the imaging optical system;
an image sensor configured to photoelectrically convert the optical image;
a driver configured to change a position of the specimen along an optical axis direction of the imaging optical system; and
an operating unit configured to reconstruct information of the specimen,
wherein the driver changes the position in acquiring a plurality of images of the specimen,
wherein the operating unit is configured to perform a compressive sensing reconstruction algorithm for the plurality of images, and
wherein the following expression is satisfied, $$D = \frac{\lambda}{2\left(1 - \sqrt{1 - NA^2}\right)}$$

where D is a depth of focus on the specimen side of the imaging optical system, NA is a numerical aperture on the specimen side of the imaging optical system, and $\lambda$ is a wavelength of illumination light from the illumination optical system, a variation amount of the position of the specimen being greater than D.

3. An image pickup apparatus comprising:
an illumination optical system configured to illuminate a specimen;
an imaging optical system configured to form an optical image of the specimen;
a light modulator configured to generate at least one of a transmittance distribution and a phase distribution which are asymmetric with respect to an optical axis on a pupil plane of at least one of the illumination optical system and the imaging optical system;
an image sensor configured to photoelectrically convert the optical image;
a driver configured to change a position of the image sensor along an optical axis direction of the imaging optical system; and
an operating unit configured to reconstruct information of the specimen,
wherein the driver changes the position in acquiring a plurality of images of the specimen,
wherein the operating unit is configured to perform a compressive sensing reconstruction algorithm for the plurality of images, and
wherein the following expression is satisfied, $$D' = \frac{\lambda}{2\left(1 - \sqrt{1 - NA'^2}\right)}$$

where D' is a depth of focus on the image side of the imaging optical system, NA' is a numerical aperture on the image side of the imaging optical system, and $\lambda$ is a wavelength of illumination light from the illumination optical system, a variation amount of a position of the image sensor being greater than D'.

4. The image pickup apparatus according to claim 1, wherein the light modulator generates at least one of a transmittance distribution and a phase distribution which are asymmetric with respect to the optical axis on the pupil plane of both the illumination optical system and the imaging optical system.

5. The image pickup apparatus according to claim 1, wherein the illumination optical system and the imaging optical system form a partially coherent imaging system.

6. The image pickup apparatus according to claim 1, wherein the illumination optical system and the imaging optical system form an incoherent imaging system, and
wherein the light modulator generates at least one of a transmittance distribution and a phase distribution which are asymmetric with respect to the optical axis on the pupil plane of the imaging optical system.

7. The image pickup apparatus according to claim 1, wherein the pupil plane of the illumination optical system has a transmittance distribution with a monopole at a position offset from the optical axis, and an area of the monopole is equal to or narrower than an area of a circle having a diameter d, and a value of d is 1% to 20% of a radius of the pupil.

8. The image pickup apparatus according to claim 1, wherein the operating unit is configured to acquire three-dimensional information of the specimen.

9. The image pickup apparatus according to claim 1, wherein the operating unit reconstructs information of the specimen of which the number of data elements is greater than the number of all pixels of the plurality of images of the specimen.

10. The image pickup apparatus according to claim 1, wherein the information of the specimen reconstructed by the operating unit contains at least one of a refractive index, an extinction coefficient, and a fluorescent intensity, or contains information uniquely determined from at least one of the refractive index, the extinction coefficient, and the fluorescent intensity.

11. The image pickup apparatus according to claim 1, wherein the image pickup apparatus is connected to the operating unit via a network.

12. The image pickup apparatus according to claim 1, wherein the light modulator adjusts at least one of a transmittance distribution and a phase distribution on the pupil plane of at least one of the illumination optical system and the imaging optical system each time the driver changes the relative position.

13. The image pickup apparatus according to claim 1, wherein the light modulator is one of a variable diaphragm, a spatial light modulator, and a digital micro-mirror device, which is placed close to the pupil plane of at least one of the illumination optical system and the imaging optical system.

14. The image pickup apparatus according to claim 1, further comprising a display configured to display information of the specimen reconstructed by the operating unit.

15. An image pickup method of using an image pickup apparatus including an illumination optical system configured to illuminate a specimen, an imaging optical system configured to form an optical image of the specimen, and an image sensor configured to photoelectrically convert the optical image, wherein a pupil plane of at least one of the illumination optical system and the imaging optical system has at least one of a transmittance distribution and a phase distribution which are asymmetric with respect to an optical axis, and wherein the illumination optical system and the imaging optical system form a partially coherent imaging system, the image pickup method comprising:
a drive step of changing a relative position in an optical axis direction of the imaging optical system between a focal plane of the imaging optical system and at least one of the specimen and the image sensor;

an image pickup step of acquiring images of the specimen by the image pickup apparatus; and a reconstruction step of performing a compressive sensing reconstruction algorithm using the following expressions for a plurality of images obtained by repeating the driver step and the image pickup step, and of reconstructing information of the specimen:

$$I = \Phi T$$

$$T = 1 + i\pi(n_0^2 1 - n \cdot n)$$

where I is a M×1 vector obtained by combining the plurality of images and subtracting a constant, $\phi$ is a M×N matrix determined from the illumination optical system and the imaging optical system, T is a N×1 vector representing three-dimensional information of the specimen, n is an N×1 vector representing a three-dimensional refractive index distribution of the specimen, $n_0$ is a background refractive index of the specimen, • is an operator for taking the Hadamard product, and 1 is an N×1 vector having all elements of 1.

16. The image pickup method according to claim 15, further comprising a light modulation step of generating at least one of a transmittance distribution and a phase distribution which are asymmetric with respect to an optical axis on a pupil plane of at least one of the illumination optical system and the imaging optical system.

* * * * *